3,010,267
CARTON SEALING APPARATUS
Ralph R. Richardson and John M. Langland, Chicago, Ill., assignors, by mesne assignments, to Chicago Carton Company, Chicago, Ill., a corporation of Delaware
Filed May 25, 1959, Ser. No. 815,479
3 Claims. (Cl. 53—379)

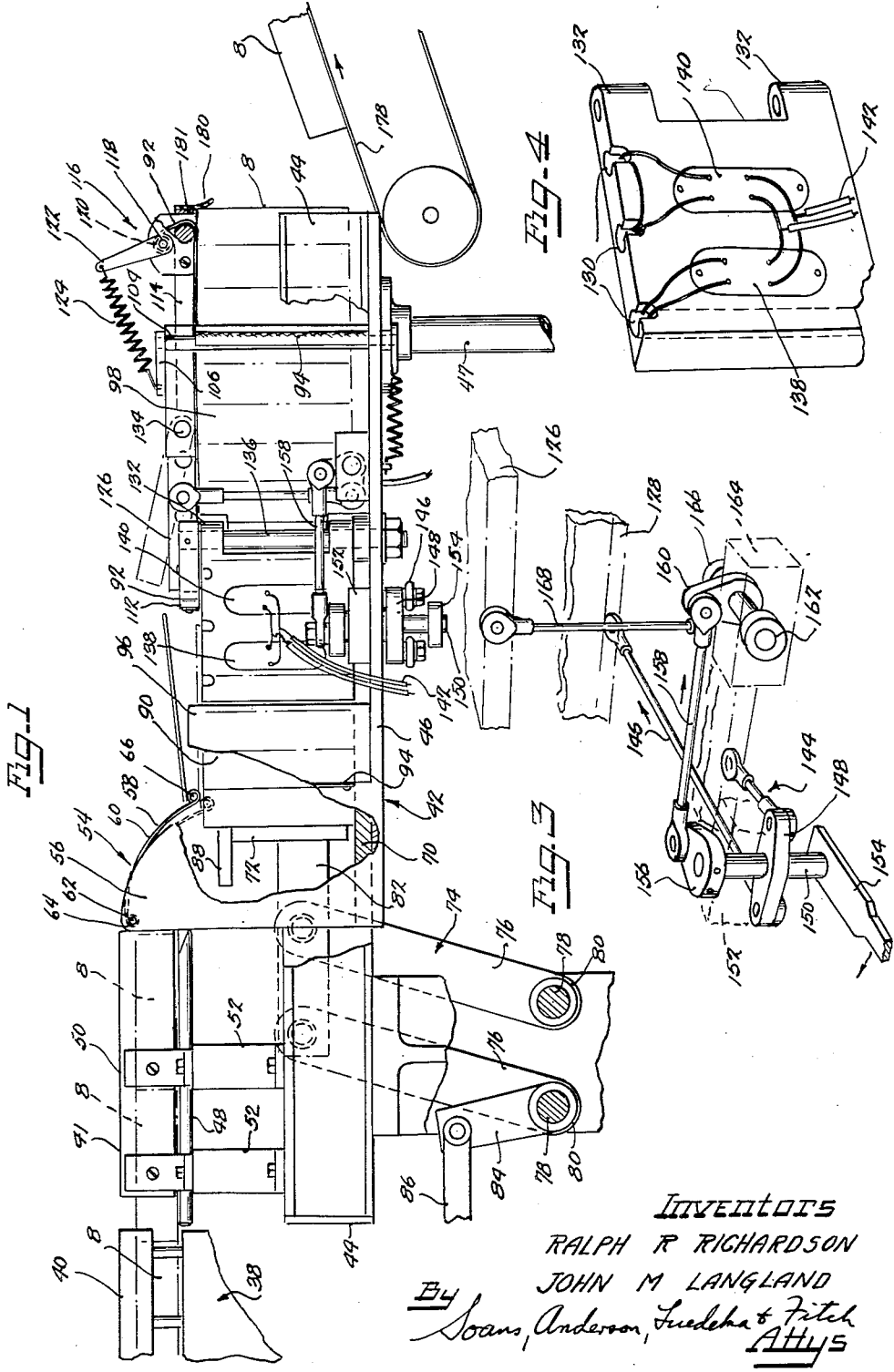

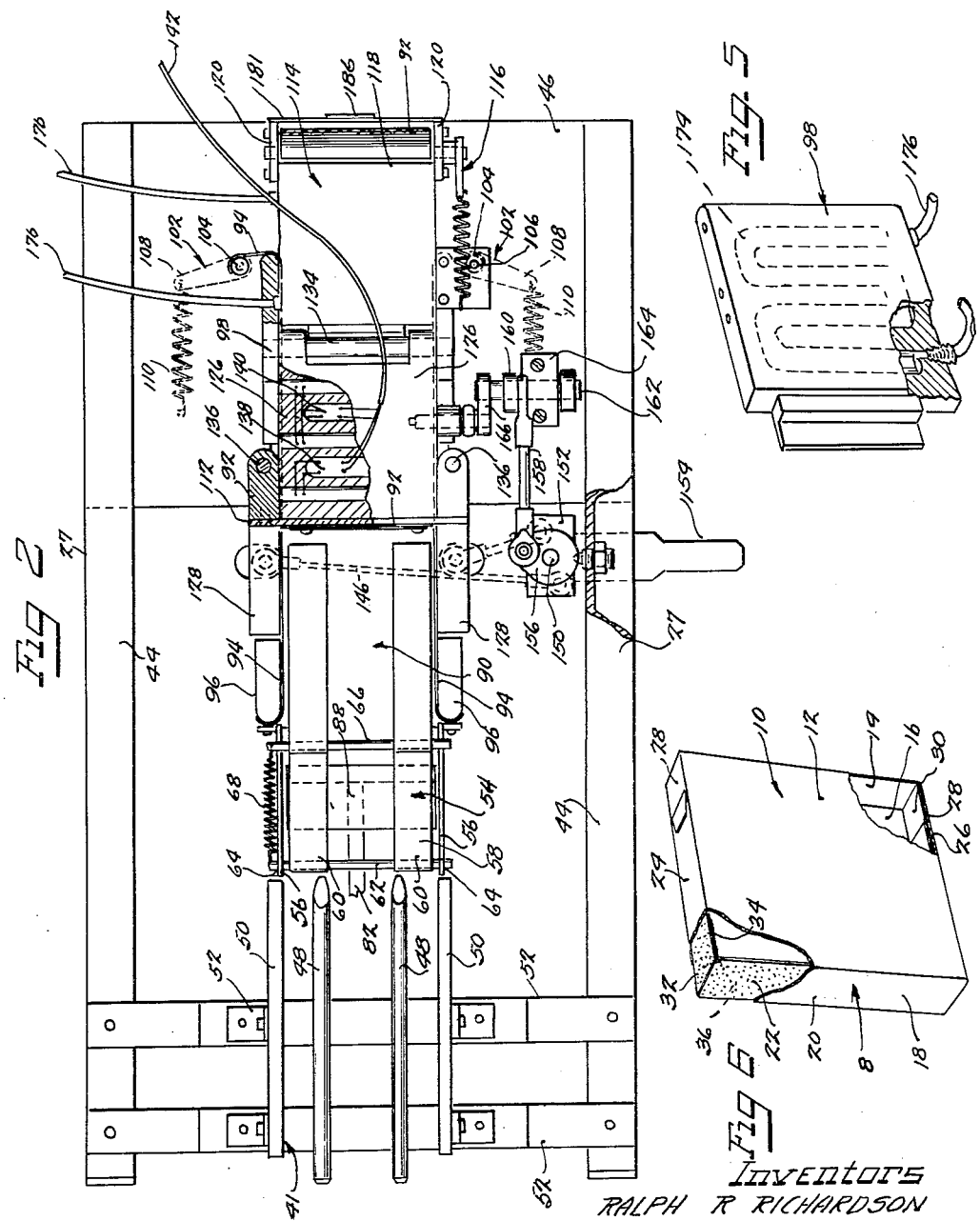

The present invention relates generally to an apparatus for sealing cartons, and more particularly to an apparatus for heat sealing cartons containing thermoplastic substances.

Cartons are ordinarily sealed either with solvent dispersed adhesives or with thermoplastic sealing compounds. However, in the case of cartons containing thermoplastic substances, such as margarine, butter, etc., it has previously been considered impractical to heat seal the cartons, for if the heat transferred to the cartons to melt the thermoplastic compound was excessive, it would result in undesirable melting of the thermoplastic within the cartons. This was especially true in the case of an interruption of the movement of the cartons past the heating devices.

Therefore, in previously available packaging machines for thermoplastic substances, the cartons have been sealed by applying a solvent dispersed adhesive, such as paste, to the closure flaps. It has been found that the seal provided by utilizing paste has been easily opened and, in fact, has oftentimes come open during shipment. Moreover, such a seal has been ineffective to prevent tampering with the contents within the cartons.

Maintenance has always been a problem with paste-sealing equipment. Since dirt and cardboard waste readily stick to the paste, such equipment requires frequent cleaning. Also, the paste applicator becomes easily clogged with dried paste or such, necessitating a shut down of the packaging operation.

Accordingly, an object of the present invention is the provision of an apparatus for heat sealing cartons containing thermoplasic substances, such as butter and margarine. Another object is the provision of an apparatus for heat sealing cartons issuing from a margarine packing machine without melting the margarine with the cartons. A further object is the provision of an apparatus adapted for heat sealing cartons containing thermoplastic substances which apparatus is provided with a means for rapidly reducing the heat applied to the cartons in case of an interruption of the movement of the cartons through the apparatus. Still a further object is the provision of a heat sealing apparatus for cartons containing thermoplastic substances which is efficient in operation and requires little or no maintenance.

Other objects and advantages of the present invention will become apparent by reference to the following description and accompanying drawings.

In the drawings:

FIGURE 1 is a side elevational view of a carton sealing apparatus embodying various features of the present invention, with portions of the apparatus being broken away to show the internal construction thereof;

FIGURE 2 is a plan view of the carton sealing apparatus shown in FIGURE 1;

FIGURE 3 is a simplified perspective view of the linkage utilized to move the heating members of the carton sealing apparatus shown in FIGURES 1 and 2;

FIGURE 4 is a fragmentary perspective view of one of the heating members of the carton sealing apparatus shown in FIGURES 1 and 2;

FIGURE 5 is a perspective view of a cooling block of the carton sealing apparatus shown in FIGURES 1 and 2, with portions broken away to show the internal construction thereof; and FIGURE 6 is a perspective view of a carton, such as might be sealed by the carton sealing apparatus shown in FIGURES 1 and 2, portions of the carton being broken away to show the construction thereof.

The heat sealing apparatus in accordance with the present invention is adapted to seal cartons containing thermoplastic substances, such as margarine, butter, etc., the cartons having heat sealing compound, such as a thermoplastic lacquer, disposed between the overlapping flaps and/or walls thereof. The apparatus includes a frame which is provided with means for defining a guideway for the cartons, the cartons being propelled along the guideway by a propelling means. Means are provided for heating selected portions of the guideway defining means to render the thermoplastic compound tacky as the cartons are propelled along the guideway. Means are provided for cooling selected portions of the guideway defining means to set the compound as the cartons are propelled along the guideway. Means are provided for rapidly reducing the heat applied by the heating means to the guideway defining means in case the propelling means becomes inoperative.

While a carton sealing apparatus in accordance with the invention may be utilized to seal various sizes and shapes of cartons, the illustrated carton sealing apparatus is particularly adapted for sealing a carton such as that illustrated by the reference number 8 in FIGURE 6. which carton 8 is adapted to package ¼ pound sticks of margarine.

The illustrated carton 8 includes a rectangular tube 10 formed by four side walls 12, 14, 16 and 18, one of the side walls 18 being formed by a pair of overlapping flaps 20 and 22. The tube 10 is provided with a top end wall 24 and a bottom end wall 26, each end wall 24 and 26 being formed by overlapping closure flaps 28, 30, 32 and 34 integrally connected to the side walls 12, 14, 16 and 18, respectively.

Before the carton 8 is erected, the flap surfaces, which are to underlie the outer flaps are coated with heat sealing compound 36, such as heat sealing lacquer, which is non-tacking at room temperatures so that the carton blanks do not stick to each other. For convenience, the heat sealing compound may be applied at the same time that the carton blanks are printed with descriptive information.

The carton sealing apparatus illustrated in the drawings is adapted to be connected to the output or forward end of a packing machine 38 used to package margarine. In general, the margarine packing machine 38 forms the bulk margarine into ¼ pound rectangular sticks, wraps the sticks of margarine with foil or suitable parchment paper, and feeds the sticks along a horizontal path of travel.

As the sticks are moved along the packing machine 38, they are packed into cartons 8, four sticks to each carton. The cartons 8, with their side walls 14 forwardmost, are propelled along a horizontally extending guideway 40 at the output end of the packing machine 38 by a pusher mechanism (not shown), the cartons 8 being pushed into a horizontally extending guideway 41 at the left hand end, as shown in FIGURE 1, of the carton sealing apparatus. For purposes of explanation, the left hand end of the carton sealing apparatus shown in FIGURE 1 will be hereinafter referred to as the rearward end, and the right hand end will be referred to as the forward end.

The carton sealing apparatus, as shown in the drawings, includes a frame 42 which supports all of the operating elements of the carton sealing apparatus. The frame 42 is suitably fabricated from a pair of longitudinally extending, transversely spaced apart channels 44, the lower flanges of which are mounted to a horizontally disposed plate 46. The rearward end of the frame 42 is supported at the proper height by a portion of the packaging machine 38, and the forward end of the frame 42 is supported by a stand 47.

The cartons 8 are pushed along the rearward guideway 41 of the carton sealing apparatus by the succeeding cartons issuing from the output guideway 40 of the packaging machine. In the illustrated embodiment, the lower surface of the rearward guideway 41 is provided by a pair of longitudinally extending, transversely spaced apart bottom rails 48 which are disposed at such a height as to form a continuation of the lower surface of the output guideway 40 of the packing machine 38.

The cartons 8 are guided as they are moved along the bottom rails 48, and the outer end wall flaps 28 are maintained in their closed position, by a pair of spaced apart, longitudinally extending guide plates 50 disposed so as to slidably engage the end walls 24 and 26 of the cartons 8. The outer flaps 20 of the rearward facing side walls 18 are maintained in their closed positions by succeeding cartons 8. The guide plates 50 and the bottom rails 48 are suitably mounted to the frame 42 by brackets 52 or such.

When the cartons 8 are propelled to the forward ends of the rails 48, they are successively rotated 90° by a chute or tumbler 54 so that the leading side wall 14 of each carton 8 faces downwardly. In the illustrated embodiment, the chute 54 includes a vertically extending side wall 56 disposed on each side of the path of travel of the cartons 8, the wall 56 being suitably mounted to the frame 42.

The cartons 8 are guided downwardly in the chute 54 by a pivotally mounted upper guide 58 which includes a pair of transversely spaced apart strips 60 fixedly mounted at their rearward ends to a transversely extending shaft 62, which is journalled in apertures 64 in the walls 56. The strips 60 are curved downwardly as shown in FIGURE 1 and thence are extended forwardly, the strips 60 being maintained in spaced apart relation by a transversely extending rod 66 fixedly mounted below the strips 60 at the intersection of the curved portions and the forwardly extending portions. The rod 66 is made of sufficient length to engage the upper edge of the side walls 56 of the chute 54 and thereby act as a stop for the downward travel of the guide 58. The guide 58 is urged downwardly by a tension spring 68 connected between the end of the rod 66 and a projection (not shown) at the side wall 56 of the chute 54.

The carton 8 tumbles downwardly until the leading side wall 14 thereof strikes a longitudinally extending horizontally disposed lower guide plate 70 which is suitably mounted to the frame 42.

A forward transversely extending pusher plate 72 of a reciprocating mechanism 74, which is operated in timed relationship with the operation of the packaging machine 38, forms the rearward wall of the chute 54. The timing of the reciprocating mechanism 74 is such that when the carton 8 strikes the lower guide plate 70, the reciprocating mechanism 74 causes the pusher plate 72 to be moved forwardly, thereby engaging the rearward facing side wall 16 of the rotated carton 8.

The reciprocating mechanism 74 includes a pair of crank arms 76 each fixedly mounted by one end to a shaft 78 journalled in bearings 80 suitably mounted to the packaging machine 38, and by the other end to a common pusher rod 82. The forward end of the pusher rod 82 is connected to the pusher plate 72 that is adapted to engage the rearward facing side wall 16 of the rotated carton 8. The reciprocating mechanism 74 is reciprocated by a crank arm 84 fixedly mounted by one end to one of the shafts 78. The other end of the crank arm 84 is rotatably connected to a tie rod 86 which is reciprocated by a timing mechanism (not shown) in the packaging machine 38.

The reciprocating pusher mechanism 74 pushes the carton forwardly in the carton sealing apparatus on its forward stroke, pivoting the upper guide 58 upwardly. The rotated carton 8 is moved to a position such that the rod 66 drops therebehind. This prevents the rotated carton 8 from falling rearwardly when the pusher plate 72 is moved rearwardly.

Succeeding cartons are prevented from falling behind the pusher plate 72 when it is moved to its forward position by a horizontally disposed plate 88 fixedly mounted to the top of the pusher plate 72.

The rotated cartons 8 are moved forwardly along a guideway or passageway 90 in the carton sealing apparatus by the rearwardmost rotated carton 8 being pushed forwardly by the pusher plate 72 of reciprocating mechanism 74. In the illustrated embodiment, the guideway 90 is defined by elongated upper and side sheets 92 and 94, respectively, of material having a smooth surface, a good heat transmission and good heat stability, such as plastic impregnated fiber glass, the plastic being tetrafluoroethylene polymer, commercially available under the registered trademark "Teflon." The sheets 92 and 94 provide smooth surfaces for the passage of the cartons 8 while retaining the outer flaps 20 and 28 in a closed position.

In the illustrated embodiment, each vertically disposed side sheet 94 is suitably anchored at its rearward end to the rearward edge of a vertically disposed block 96 which is suitably mounted to the frame 42. The forward end of each sheet 94 is disposed about the forward edge of a side cooling member 98, which is described hereinafter, and is drawn taut by a tensioning device 102 connected to the end of the sheet 94.

The tensioning device 102 includes a vertically disposed shaft 104 journalled in bearings 106 suitably mounted to the frame 42, a crank arm 108 connected to the lower end of the shaft 104 and a spring 110 connected to the crank arm 108 for keeping the sheet 94 under tension.

The upper sheet 92 is anchored at its rearward end to a transversely extending bar 112 which is suitably mounted to the frame 42 and the forward end of the upper sheet 92 is disposed about the forward edge of an upper cooling member 114, which is described hereinafter. The upper sheet 92 is maintained in a tensioned condition by a tensioning device 116 including a transversely extending shaft 118 attached to the end of the sheet 92 and journalled in bearings 120 suitably mounted to the frame 42. A crank arm 122 fixedly mounted to one end of the shaft 118 and a spring 124 attached to the crank arm 122 maintains the upper sheet 92 under tension.

As each rotated carton 8 is pushed forwardly in the passageway 90, it passes a plurality of heating members 126 and 128 located along the outer surface of the "Teflon" sheets 92 and 94, respectively. The members 126 and 128 are heated sufficiently to render the heat sealing compound tacky without melting the margarine within the cartons 8. In the illustrated embodiment, the heating members 126 and 28 are rectangular in shape and each includes three electrical heating elements 130. Each heating member 126 and 128 is provided with a pair of spaced apart bearings 132 on its forward end by which the members 126 and 128 are rotatably mounted on shafts 134 and 136, respectively, the shafts 134 and 136 being suitably mounted to the frame 42.

Applicants have found that, in order to properly seal the carton 8 without melting the contents within the carton, it is necessary to maintain the temperature of the heating members 126 and 128 relatively constant, and also that it is preferable to maintain the forward portion of the heating members 126 and 128 at a higher temperature than the rearward portion. Therefore, in the illustrated embodiment, the rearwardmost heating element 130 in each member 126 and 128 is controlled by one adjustable thermostat 138, and the other two elements 130 in the members 126 and 128 are connected in parallel and are controlled by a second adjustable thermostat 140. The thermostats 138 and 140 are connected in parallel to a suitable source of power (not shown) by means of conductors 142.

In order to prevent the contents within the cartons 8 from melting when the packaging machine is stopped for maintenance or for other purposes, a linkage means 144 is provided in the illustrated embodiment to enable the operator to move the heating members 126 and 128 away from the guideway 90, thereby reducing the heat applied to the cartons 8. When the heating members 126 and 128 are moved away from the guideway 90, the outer flaps 20 and 28, which have a tendency to open, are retained in their closed positions by the upper and side sheets 92 and 94. Thus, the heating members 126 and 128 may be moved back against the guideway 90, when the packaging machine becomes operative, without the necessity of reclosing the flaps 20 and 28.

As shown in the drawings, the linkage means 144 includes a tie rod 146 rotatably connected by one end to the rearward portion of each side heating member 128, the other end of each tie rod 146 being rotatbly connected to one end of a common rocker arm 148. The rocker arm 148 is fixedly mounted intermediate its ends to a vertically disposed shaft 150, the shaft 150 being journalled in bearings 152 suitably mounted to the frame 42. The shaft 150 is manually rotated by a lever 154 fixedly attached to the lower end thereof whereby the side heating blocks 128 are rotated about their associated shafts 136.

The upper heating member 126 is also moved by the rotation of the shaft 150. The rotation of the shaft 150 is transmitted through a crank arm 156 fixedly attached to the upper end thereof to a tie rod 158, one end of which is rotatably connected to the crank arm 156. The other end of the tie rod 158 is rotatably connected to the outer end of a second crank arm 160. The second crank arm 160 is fixedly attached to a horizontally disposed shaft 162 which is journalled in bearings 164 suitably mounted to the frame 42.

The movement of the horizontally disposed shaft 162 is transmitted to the upper heating member 126 by a third crank arm 166 fixedly connected by one end to the shaft 162 and rotatably connected at its other end to a tie rod 168 which tie rod 168 is rotatably connected to the rearward portion of the upper heating member 126.

While the heating members 126 and 128 shown in the drawings are manually moved by the operator, it should be realized that the members 126 and 128 may be moved automatically as by a solenoid.

After the heat sealing compound is rendered tacky by the heating members 126 and 128, the cartons are moved along the guideway 90 to a cooling station wherein the compound is set to thereby seal the cartons 8. In the illustrated embodiment, the cooling station includes upper and side cooling members 114 and 98, respectively, disposed along the top and sides of the guideway 90 adjacent the outer surface of the upper and side sheets 92 and 94, respectively. The cooling members 114 and 98 are rectangular blocks suitably mounted to the frame 42 and having cooling passages 174 therein which are connected by flexible hoses 176 to a source (not shown) of cooling water and a drain (not shown).

The cartons 8 after they pass through the cooling station, are successively pushed onto a conveyor belt 178 which moves the cartons 8 to succeding operations wherein the cartons 8 may be packed in shipping containers for shipment to the ultimate consumer. To insure that the cartons lie flat on the conveyor belt 178, the upwardly facing side walls 18 of the cartons 8 are frictionally engaged by a flexible lip 180 extending downwardly into the passageway 90, the lip 180 being suitably mounted to a transversely extending bar 181 which, in turn, is mounted to the frame 42.

It is very important in the carton sealing apparatus to provide a temperature in the heating members 126 and 128 which is sufficient to render the heat sealing compound tacky but not enough to melt the contents within the cartons 8. The heat transferred to a certain size carton depends mainly upon the speed of the carton 8 past the heating members 126 and 128, the length of the heating members 126 and 128, the distance between the heating members 126 and 128 and the cartons 8, and the temperature at which the heating members 126 and 128 are maintained. In one embodiment of the invention, 1½ inch thick cartons were moved past the heating members at a rate of approximately 38 cartons per minute. The carton sealing apparatus was provided with effective heating member lengths of approximately 5 inches, and .010 inch "Teflon" sheets between the heating members and the cartons. At this rate of speed, a temperature of 320° F. proved to be an acceptable temperature for the heating members.

Various changes and modifications may be made in the above described carton sealing apparatus without departing from the spirit or scope of the invention. Various features of the invention are set forth in the accompanying claims.

We claim:

1. An apparatus for heat sealing cartons containing thermoplastic substances, the cartons having overlapping flaps on opposed sides thereof and on a side thereof interconnecting the opposed sides and having heat sealing compound disposed between the overlapping flaps, said apparatus comprising a frame, means on said frame including upper, side and bottom walls for defining a guideway for the cartons, means for propelling the cartons along said guideway so that the interconnecting side is adjacent the upper wall and the opposed sides are adjacent the side walls of said guideway defining means, said guideway being of such a size that said walls are in sliding engagement with said cartons, means for applying heat to selected portions of the upper and side walls of said guideway defining means, said heating means being at a sufficient temperature to render the heat sealing compound tacky as the cartons are propelled along said guideway but not enough to melt the contents within the cartons, means for cooling subsequent selected portions of said guideway defining means to set the heat sealing compound as the cartons are propelled along the guideway, and means on said frame for rapidly moving said heating means away from said guideway defining means to thereby rapidly reduce the heat applied by said heating means to said guideway defining means.

2. An apparatus for sealing cartons containing thermoplastic substances, the cartons having heat sealing compound disposed between the overlapping flaps thereof, said apparatus comprising a frame, means on said frame defining a guideway for the cartons, means for propelling the cartons along said guideway, heating means disposed along selected portions of the outer surfaces of said guideway defining means, said heating means being movable between an operative position wherein sufficient heat is applied to the cartons as they are propelled along said guideway to render the heat sealing compound tacky, and an inoperative position wherein the heat applied to the cartons is insufficient to melt the contents within the cartons, means on said frame for moving the heating means between said operative and said inoperative positions, and means for cooling subsequent selected portions of said guideway defining means to set the heat sealing compound as the cartons are propelled along the guideway.

3. An apparatus for sealing rectangular cartons containing thermoplastic substances issuing from a packing machine in a horizontally extending path of travel, each carton having overlapping flaps on the trailing side thereof and on the sides thereof paralleling the path of travel, and having heat sealing lacquer disposed between the overlapping flaps, said apparatus comprising a frame, means on said frame for successively rotating the cartons so that the leading sides thereof face downwardly, means on said frame defining a guideway for the cartons, means for propelling the rotated cartons along said guideway, heating means pivotally mounted to the frame and disposed along selected portions of the outer surfaces of said guideway defining means, said heating means being movable between an operative position wherein sufficient heat is applied to the cartons as they are propelled along the guideway to render the heat sealing lacquer tacky and an inoperative position wherein the heat applied to the cartons is insufficient to melt the contents within the cartons, means on said frame for moving said heating means between said operative position and said inoperative position, cooling means disposed along selected portions of the outer surfaces of said guideway after the heating means, said cooling means being at a temperature such that the lacquer sets as the cartons are propelled along said guideway.

References Cited in the file of this patent
UNITED STATES PATENTS

| | | |
|---|---|---|
| 1,875,975 | Alm | Sept. 6, 1932 |
| 1,885,952 | Schmitt | Nov. 1, 1932 |
| 2,336,795 | Malhiot | Dec. 14, 1943 |
| 2,420,763 | Wells | May 20, 1947 |
| 2,563,858 | McGinley | Aug. 14, 1951 |
| 2,727,345 | Schoppee | Dec. 20, 1955 |
| 2,855,977 | Wagner | Oct. 14, 1958 |